(12) United States Patent  
Pamer

(10) Patent No.: US 7,740,436 B2  
(45) Date of Patent: Jun. 22, 2010

(54) CLINCH NUT

(75) Inventor: W. Richard Pamer, Macedonia, OH (US)

(73) Assignee: R B & W Manufacturing LLC, Streetsboro, OH (US)

( * ) Notice: Subject to any disclaimer, the term of this patent is extended or adjusted under 35 U.S.C. 154(b) by 120 days.

(21) Appl. No.: 11/689,067

(22) Filed: Mar. 21, 2007

(65) Prior Publication Data

US 2007/0224017 A1  Sep. 27, 2007

Related U.S. Application Data

(60) Provisional application No. 60/784,878, filed on Mar. 22, 2006.

(51) Int. Cl.  
*F16B 37/06* (2006.01)

(52) U.S. Cl. ...................... 411/427; 411/179

(58) Field of Classification Search ......... 411/179–181, 411/427, 501, 504  
See application file for complete search history.

(56) References Cited

U.S. PATENT DOCUMENTS

| | | | |
|---|---|---|---|
| 1,703,232 A * | 2/1929 | Gray et al. ................. | 148/226 |
| 1,759,339 A | 5/1930 | Andren | |
| 2,386,197 A | 10/1945 | Dawson | |
| 2,615,119 A | 10/1952 | Riegel | |
| 3,000,420 A | 9/1961 | Spokes | |
| 3,152,628 A | 10/1964 | Strain et al. | |
| 3,229,363 A | 1/1966 | Bien | |
| 3,253,631 A | 5/1966 | Reusser | |
| 3,276,499 A | 10/1966 | Reusser | |
| 3,365,997 A | 1/1968 | Price | |
| 3,399,705 A * | 9/1968 | Breed et al. ................. | 411/180 |
| RE27,143 E | 6/1971 | Breed et al. | |
| 3,878,598 A | 4/1975 | Steward | |
| 4,043,369 A | 8/1977 | Abernethy | |
| 4,112,812 A | 9/1978 | Wardwell et al. | |
| 4,543,023 A * | 9/1985 | Capuano ................... | 411/180 |
| 5,061,090 A | 10/1991 | Kriaski et al. | |
| 5,445,483 A | 8/1995 | Fultz | |
| 5,613,815 A | 3/1997 | Muller | |
| 5,882,159 A * | 3/1999 | Muller ...................... | 411/179 |
| 6,527,491 B1 * | 3/2003 | Uchimoto et al. .......... | 411/504 |
| 6,712,370 B2 | 3/2004 | Kawada et al. | |
| 6,961,987 B2 | 11/2005 | Nilsen et al. | |
| 7,011,584 B2 * | 3/2006 | Ward et al. ................. | 470/25 |
| 2005/0186046 A1 | 8/2005 | Shinjo | |

OTHER PUBLICATIONS

Notification of Transmittal of The International Search Report and The Written Opinion of the International Searching Authority, or the Declaration, dated Aug. 25, 2008, PCT/US07/64593, filed Mar. 22, 2007.

* cited by examiner

*Primary Examiner*—Flemming Saether  
(74) *Attorney, Agent, or Firm*—Pearne & Gordon LLP

(57) ABSTRACT

A metal clinch fastener has portions thereof selectively hardened to enable use of the fastener with metal members of differing hardness values. The selective hardening of the fastener enables mounting with application of required forces for piercing and/or plastic deformation of the metal member without undesirable deformation or distortion of the fastener. The screw thread region or zone of the fastener has a relatively lesser hardness suitable and may be pre-threaded or later threaded by engagement with a thread forming screw.

18 Claims, 11 Drawing Sheets

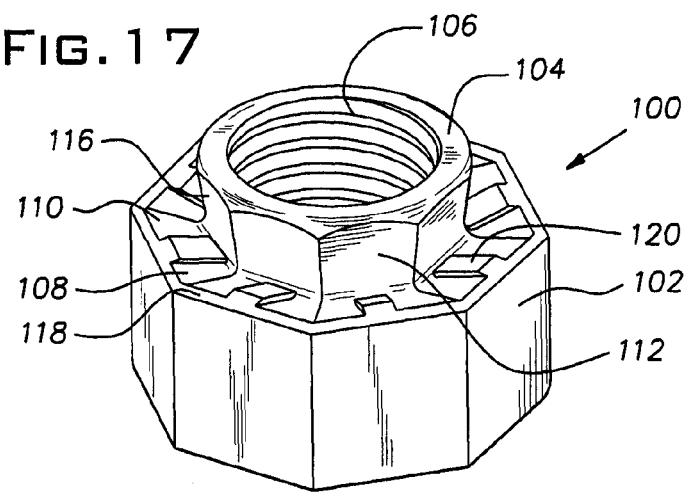
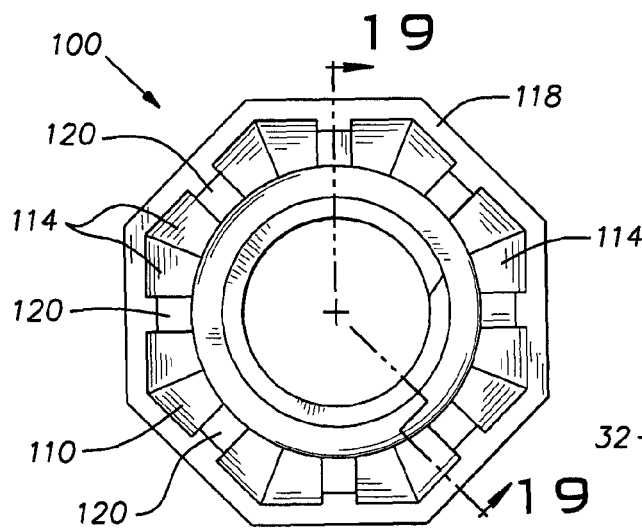
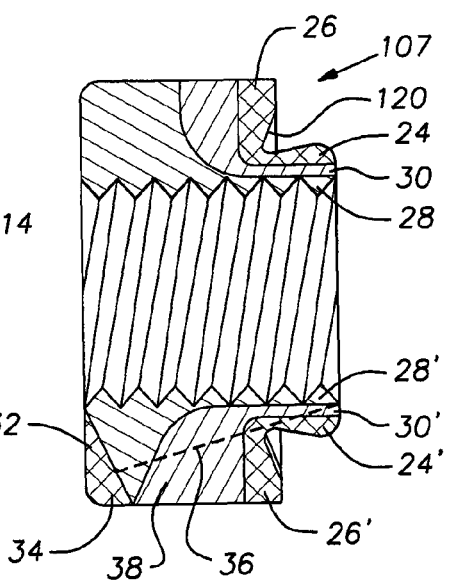

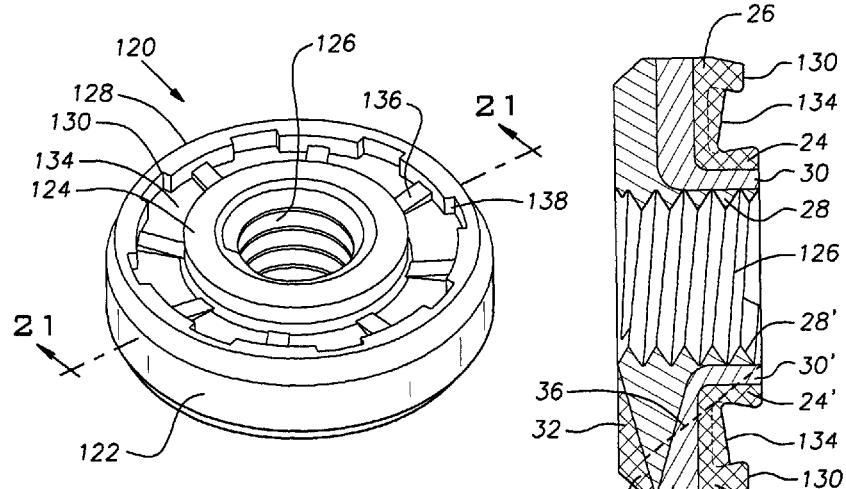
FIG. 20
FIG. 21
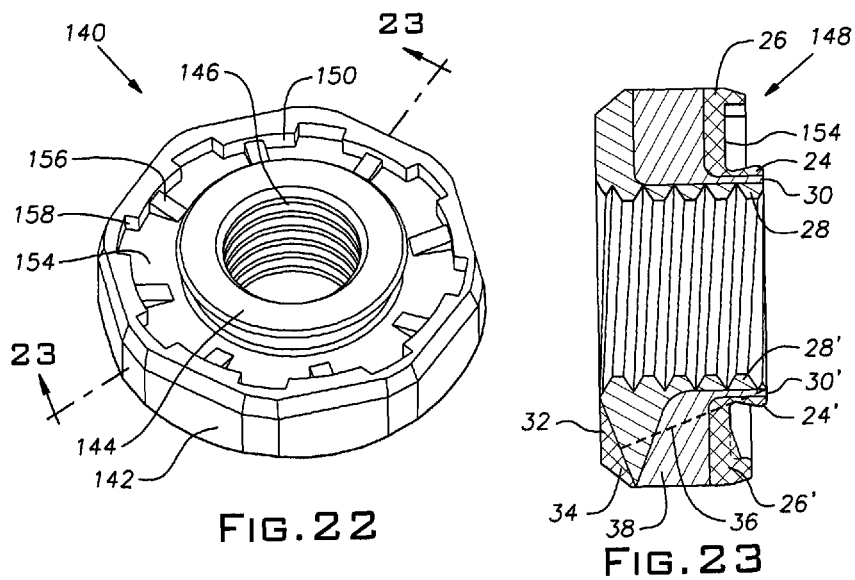
FIG. 22
FIG. 23

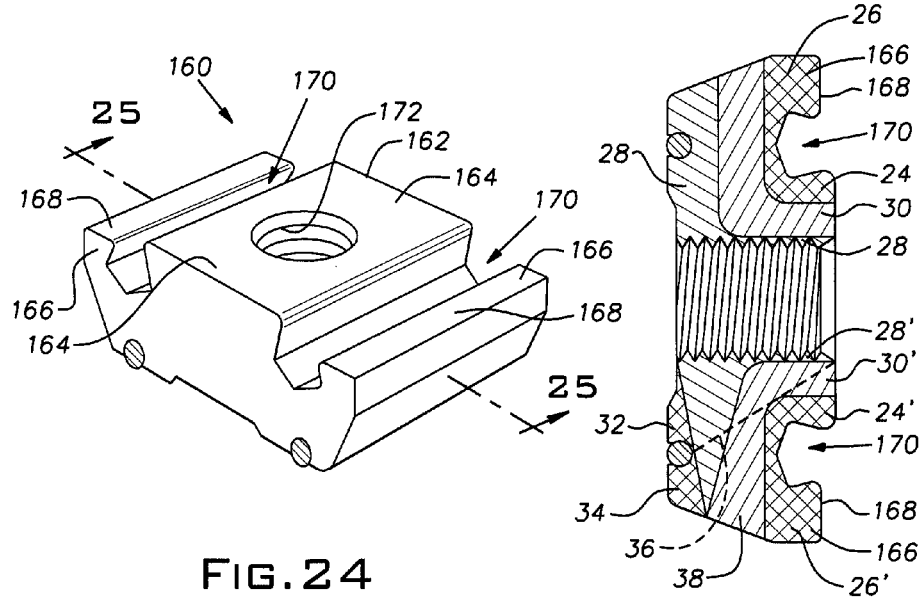
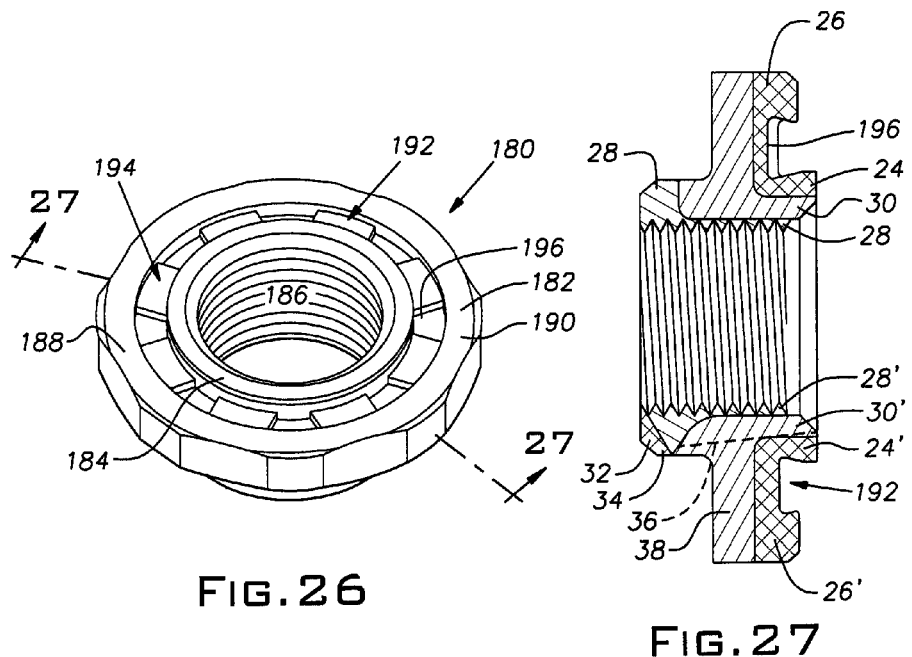

CLINCH NUT

This application claims the priority of U.S. Provisional Application No. 60/784,878, filed Mar. 22, 2006.

BACKGROUND OF THE INVENTION

The present invention generally relates to self-attaching fasteners and, more particularly, to clinch nuts.

Self-attaching fasteners are used in many industries such as, for example, the automotive and appliance industries to secure various components to metal members. A clinch nut typically includes a central pilot or punch portion, which at least partially extends into an opening in a metal plate or panel member. If the clinch nut is self-piercing, the central pilot portion cooperates with tooling to form the opening in the metal panel as the clinch nut is attached to the metal member.

The clinch nut is attached to the metal member by a die member, which forms a mechanical interlock between the clinch nut and the metal member. The die member typically deforms the metal member about the opening into contact with the pilot portion and adjacent bottom end face of the clinch nut. The pilot portion of the clinch nut may be provided with an undercut and the bottom end face may be provided with an annular groove and/or lugs to enhance the engagement with the metal member. For example, SPAC® brand clinch nuts are provided by RB&W Manufacturing LLC containing such features. The clinch nuts and the mounting thereof to metal members are illustrated in U.S. Pat. Nos. 6,220,804 and 6,409,444, the teachings of these patents being incorporated herein by reference.

When clinch nuts are attached to the metal members, screws or bolts are threaded into the clinch nuts and tightened to prescribed torque values. To that end, the clinch nut is provided with a central bore that is threaded for engagement with such screws or bolts. The central bore can also be sized to be threaded by engagement with a thread forming screw during the final assembly or installation so that different threads may be formed in accordance with specific fastening requirements. It is also desirable to form the screw thread after the clinch nut has been affixed to the metal member to avoid distortion of the screw thread during the nut mounting process.

In order to provide lighter weight products of comparable strength, there is a tendency to form the panel or plate members of high-strength low alloy (HSLA) steel, ultra high-strength low alloy (UHSLA) steel or martensitic HSLA steel. Such high-strength materials have a significantly increased hardness ranging in value from Rb 80 up to Rc 45 and require clinch nuts of increased compressive strength to assure self-piercing and/or attachment without undesirable deformation or distortion of the fastener as it is affixed to the metal member. That is, increased piercing loads and setting forces to deform the metal member into engagement with the clinch nut are required to mount the nut to the higher strength and harder metal members. Such increased piercing and setting forces may result in unwanted deformation or distortion of the fastener.

The hardness and strength of the clinch nut may not be simply increased to resolve the foregoing problems without loss of the manufacturing flexibility of thread forming by engagement with a self-threading screw. This is true since self-threading screws are intended for use with relatively ductile metals having hardness values in the range of less than 32 Rc.

It is not desirable or competitive to provide specialty self-threading screws useful with metals of differing higher hardness values and/or clinch nuts with a variety of hardness values for use with metal members of differing strength and hardness properties. This has heretofore resulted in a trade-off between the required increases in compression strength of clinch nut, especially self-piercing nuts, and the manufacturing flexibility of subsequent thread formation by engagement of the mounted clinch nut with a thread forming screw. That is, a limited number of clinch nuts of differing hardness values may be used with a number of different metal members.

SUMMARY OF THE INVENTION

It has now been found that selective hardening of metal portions of clinch fasteners enable their use with metal members of differing hardness values. The selective hardening of the fastener enables mounting with application of required forces for piercing and/or plastic deformation of the metal member without undesirable deformation or distortion of the fastener. Further, the fastener region in which screw threads are to be formed is provided with a relatively lesser hardness suitable for threading by engagement with a thread forming screw.

The clinch fastener selectively hardened in accordance with the invention may therefore be used with a variety of metal members of differing strengths and harness values such as the HSLA, UHSLA and martensitic HSLA metal species. Further, the selectively hardened clinch fastener enables the advantages of assembly connection using self-threading screws to be retained.

Induction hardening or bore tempering of a high hardness through-hardened fastener may be used to provide selective hardening of portions of clinch fasteners for use with metal members having hardness values ranging from about Rb 80 up to about Rc 45 while providing a thread forming region with a hardness value ranging from about 32 Rc down to about 90 Rb to enable use of thread forming screws. The thread forming region is thereby maintained at a hardness suitable for roll threading by commercially available thread forming screws. For example, TAPTITE® and TAPTITE 2000® thread forming screws for use in thread blanks having hardness values of about 32 Rc or less are marketed by Research Engineering & Mfg. Inc.

In the case of pre-threaded fasteners, the inner zone hardness should reflect the intended property class strength level for the fastener. For example, property class 10 would have an inner zone hardness of 26 Rc to 36 Rc and property class 9 would have an inner zone hardness of 89 Rb to 30 Rc.

The clinch fastener is typically hardened along the axial length of the pilot portion to assure the latter has a sufficient compressive strength to pierce the metal member. The pilot portion has a generally cylindrical shape, and the hardening is provided in an outer zone adjacent the periphery of the pilot portion. In this manner, the outer zone is provided with a circular or cylindrical shape which is highly resistant to buckling and thereby further strengthens the pilot portion.

The annular bottom end of the body portion of the fastener surrounding the pilot portion may also be hardened to provide a bottom end zone having a hardness substantially equal to that of the outer zone. The hardened bottom zone cooperates with the outer zone to coin and deform the metal member into tight engagement with the fastener. Further, the hardening of the bottom zone enhances the security and mounting of the fastener to the metal member. The bottom zone may be provided with specially configured or shaped elements for better deforming and/or interlocking with plastically deformed metal.

The induction hardening technique is effective to provide little, if any, hardening of an inner zone adjacent the central bore of the fastener. This inner zone is thereby maintained at a hardness corresponding with that of the original fastener, and it may be threaded by engagement with a thread forming screw.

In the illustrated embodiments, the outer and inner zones are connected by an intermediate zone having a hardness that decreases in a transverse or radially inward direction. The intermediate zone insulates the inner zone from undesired increases in hardness during induction hardening of the outer zone.

In another embodiment of the invention, the top annular end face of the body portion of the fastener is also induction hardened to provide a top zone having a hardness greater than that of the inner zone and/or substantially equal to that of the outer zone. The top zone enhances the fastener's resistance to the relatively greater piercing and/or setting forces required to affix the fastener to the higher strength metal members.

In this further embodiment, the outer periphery of the body portion of the fastener may also be induction hardened to provide a peripheral zone having a hardness greater than that of the inner zone and/or substantially equal to that of the outer zone. The peripheral zone may extend along a portion of the axial extent of the outer periphery of the body portion to provide additional fastener strength.

In a further variation, the peripheral zone extends along the entire axial extent of the outer periphery of the body portion to connect the top zone and the bottom zone. This provides joined and substantially continuous zones of increased hardness about nearly the entire periphery or outer portions of the fastener. This further increases and enhances the fastener's resistance to the relatively greater piercing and/or setting forces required to affix the fastener to the higher strength metal members.

BRIEF DESCRIPTION OF THE DRAWINGS

FIGS. 17 through 19 are similar to FIGS. 8 through 10 and show another clinch nut including a specific piercing and/or engagement geometric configuration that is induction hardened in accordance with the invention;

FIGS. 20 and 21 respectively comprise a perspective view and a sectional view, taken along the line 21-21 in FIG. 20, of a fastener including a specific piercing and/or engagement geometric configuration that is induction hardened in accordance with the invention;

FIGS. 22 and 23 respectively comprise a perspective view and a sectional view, taken along the line 23-23 in FIG. 22, of a fastener including a specific piercing and/or engagement geometric configuration that is induction hardened in accordance with the invention;

FIGS. 24 and 25 respectively comprise a perspective view and a sectional view, taken along the line 25-25 in FIG. 24, of a fastener including a specific piercing and/or engagement geometric configuration that is induction hardened in accordance with the invention;

FIGS. 26 and 27 respectively comprise a perspective view and a sectional view, taken along the line 27-27 in FIG. 26, of a fastener including a specific piercing and/or engagement geometric configuration that is induction hardened in accordance with the invention;

DETAILED DESCRIPTION OF THE INVENTION

Figure 1:
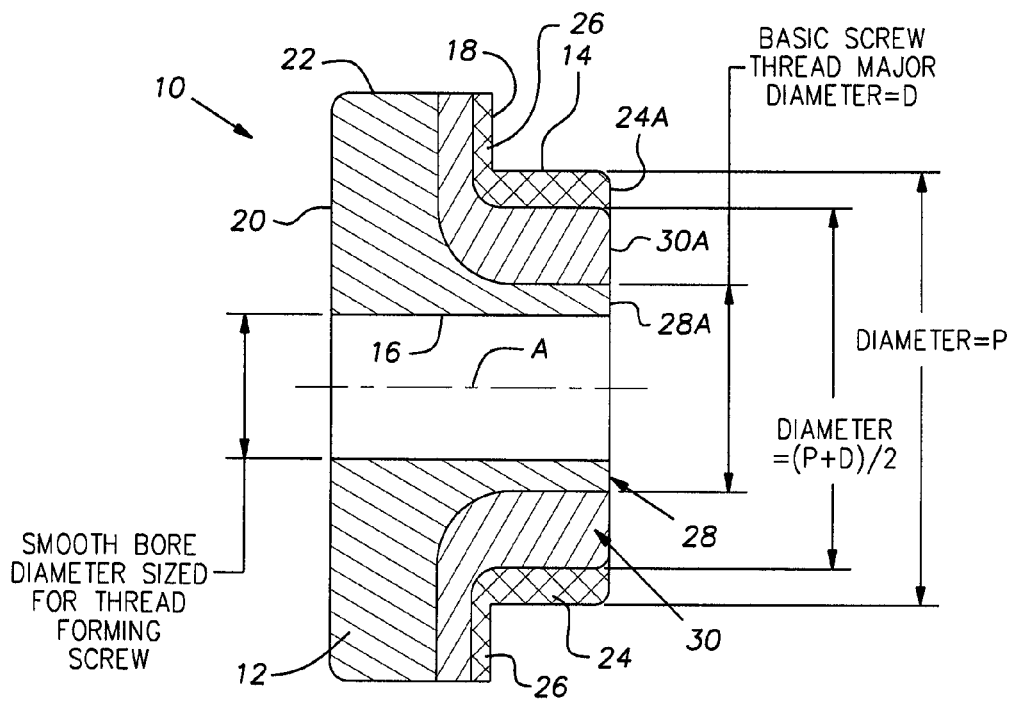
FIG. 1 is a sectional view of a clinch fastener selectively hardened in accordance with the invention.

FIG. 1 shows a self-piercing clinch nut 10 in accordance with the invention for attachment to a plastically deformable metal plate or panel member. While the illustrated embodiment is a nut, other self-clinching fasteners such as, for example, self-clinching studs are within the scope of the present invention. Hereinafter, the invention is described with particular reference to a self-piercing clinch nut. However, the invention is equally applicable to clinch nuts to be mounted in a preformed opening in the metal member since the increased setting forces for high strength metal members may also make selective hardening advantageous in avoiding crushing and/or distortion of the nut.

The clinch nut has a body portion 12 and a pilot or punch portion 14 extending from one end of the body portion 12. A thread blank or bore 16 extends along the longitudinal axis "A" of the nut 10. The bore 16 is sized for threading by engagement with a thread forming screw. It is understood that this bore may be pre-threaded and suitable for use with non-thread forming screws. Also, the transitional selective hardening improvements of the invention may be employed on "through-hardened nuts" as well as nuts in an "as-formed" condition.

The body portion 12 includes an annular mounting or bottom end face 18, an annular top end face 20 and a peripheral body face 22. The body face 22 joins the end face 18 and the top face 20. For convenience, the nut 10 is schematically illustrated in that pilot portion 14 is not shown with undercuts, the bottom end face 18 is not provided with a groove and/or gripping lugs and the body face 22 is not provided with wrenching flats. All of these known features are shown in the above referenced U.S. Pat. Nos. 6,220,804 and 6,409,444.

As indicated by cross-hatching in FIG. 1, portions of the nut 10 have been selectively hardened to form an outer zone 24 axially extending along the periphery of the pilot portion 14 and a bottom zone 26 extending along the annular face 18. The zones 24 and 26 are hardened to a value in the range of from about 40 Rc to about 60 Rc.

The induction hardening may be provided by passing the nut 10 over a linear coil. The nut may be simultaneously rotated to provide hardening along the entire periphery of the pilot portion and the bottom end face. Induction heating provides reliable and repeatable non-contact heating which may be limited to very small areas within precise production tolerances. Therefore, the speed of movement of the nut, the coil power and the coil length may be controlled to provide the desired degree of hardening of the nut by employing well understood heating and quenching technology in accordance with the teachings herein. The nut may be subsequently tempered.

As described, the induction hardening process is sufficiently controllable so that substantially no hardening occurs in an inner zone 28 extending along the bore 16. The inner zone 28, therefore has a hardness corresponding with the hardness of the metal used to form the nut 10 and may range in value from about 32 Rc to about 90 Rb. Upon forming the screw threads in the bore 16, the thread rolling process results in work hardening of the threads.

As shown in FIG. 1, the minimum transverse or radial extent of the inner zone 28 along the pilot portion 14 is sized for the intended thread to be formed by thread rolling, and typically, will be at least equal to the major diameter of the thread to be formed. In the body portion 12 of the nut, remote of the pilot portion 14, the inner zone 28 extends radially outward in a flared bell shape with a substantially thicker end wall.

The outer zone 24 and the bottom zone 26 are connected to the inner zone 28 by an intermediate zone 30. The intermediate zone 30 has a generally cylindrical shape in the pilot portion 14 and flares radially outwardly in the body portion 12.

The intermediate zone 30 protects the inner zone 28 against any substantial hardening during the induction heating to form zones 24 and 26. Consequently, the intermediate zone 30 is heated and hardened to a limited extent and has an decreasing hardness gradient in a direction extending away from the zones 24 and 26. The intermediate zone 28 may have a hardness in the range from about 30 Rc to about 40 Rc.

The nut 10 is of adequate size to allow sufficient induction hardening in the outer zone 24 to strengthen the nut for use with the above-mentioned high-strength materials while simultaneously maintaining the inner zone 28 free of additional hardening. For example, the transverse or radial extent of the pilot portion not devoted to the inner zone 28 may be equally divided between the outer zone 24 and the intermediate zone 30. That is, the radial width of the annular faces 24a and 30a are equal, and the area of face 24a is larger than the area of the face 30a. The inner zone 28 also has an annular end face 28a that cooperates with the faces 24a and 30a to form the pilot annular end face for engaging the metal member.

Figure 2:
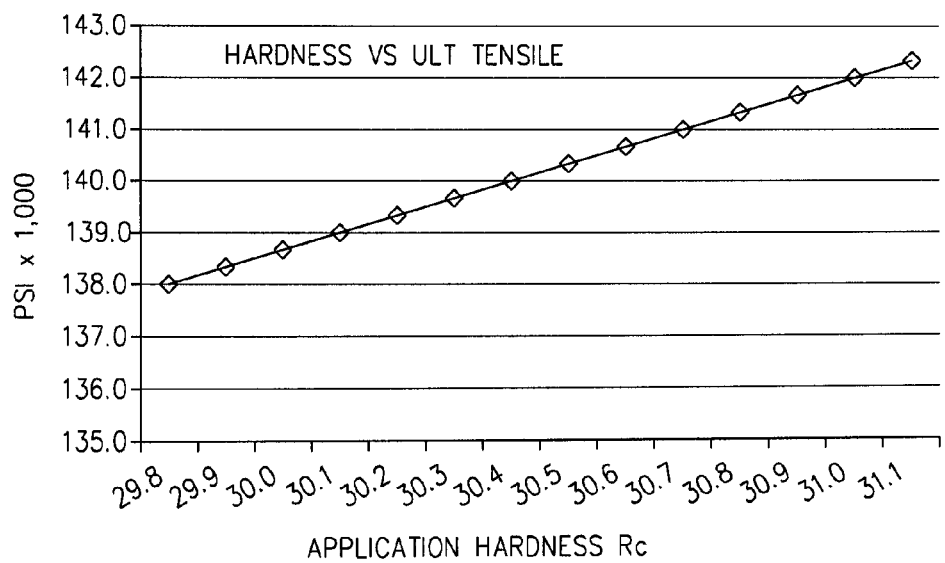
FIGS. 2, 3, 4 and 5 are graphs correlating hardness and ultimate tensile strength for steel based upon data reported in SAE J417b.
Figure 3:
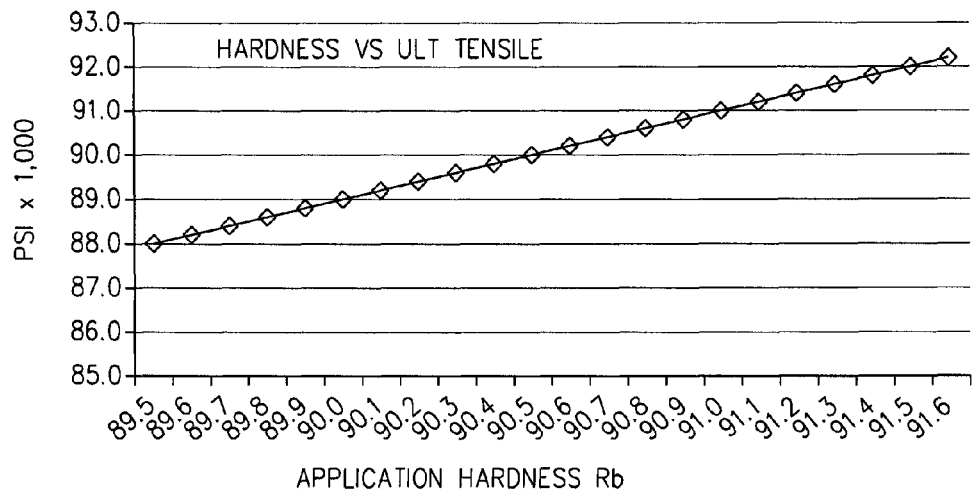

Referring to FIGS. 2 through 5, the correlation between hardness and the ultimate tensile strength for steel is shown based on extrapolated data from SAE J417b standard. To estimate the ultimate tensile strength for the range of metals to be used to form the clinch fastener, the average tensile values corresponding with the hardness range of from 30 Rc to 90 Rb is determined. FIG. 2 indicates that the ultimate tensile strength for steel having a hardness of Rc 30.0 is 138,700 psi and FIG. 3 indicates the corresponding value for Rb 90.0 to be 89,000 psi. The average of the two tensile values is 113,850 psi or 785 Mpa. The average tensile value is used to approximate the compressive strength and the compressive strength of the pilot portion of the nut is estimated by multiplying the compressive strength of the metal by the transverse or cross-sectional area of the pilot portion.

Figure 4:
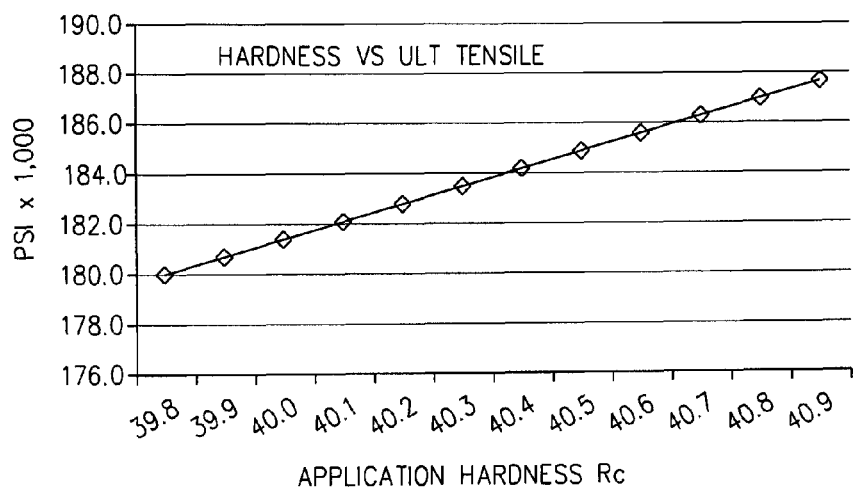
Figure 5:
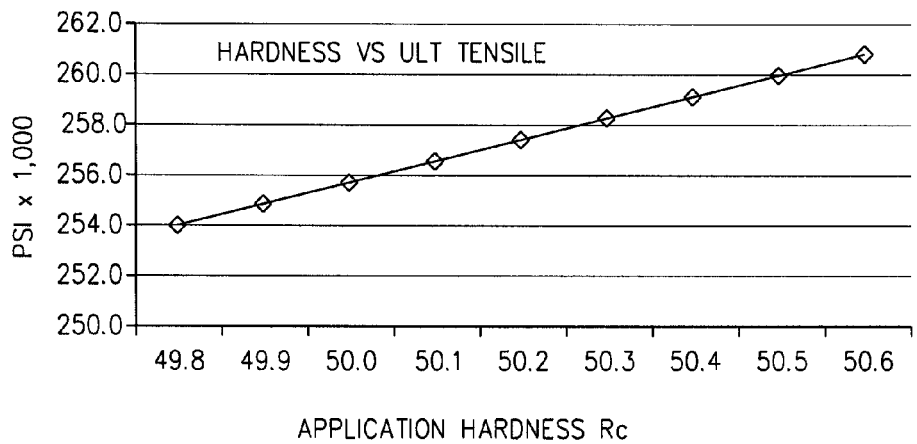

Using the above technique, the compressive strength of the metal forming each of the zones 24, 28 and 30 may be determined. For example, zone 24 is to be provided with a hardness of 40 Rc to 50 Rc. FIG. 4 indicates that a 40 Rc hardness corresponds with a tensile strength of 181,400 psi and FIG. 5 indicates that a 50 Rc hardness corresponds with a tensile strength of 255,700 psi. The average of the two values is 218,500 psi or 1,506 Mpa.

Accordingly, the contribution of each of the zones to the compressive strength of the pilot portion may be determined by multiplying the compressive strength of the metal of the zone by cross-sectional area of the zone and summing the products to provide the compressive strength of the induction hardened pilot portion 14 of the nut 10.

The use of selective hardening to strengthen clinch nuts having thread blank sizes ranging from M6×1 to M12×1.75 is shown in Table 1. For purposes of area calculations for the various zones, the thread size, pilot diameter and smooth bore diameter are reported. The zone cross-sectional areas are calculated assuming the linear transverse or radial extent of the pilot portion not devoted to the inner zone 28 is equally divided between the outer zone 24 and the intermediate zone 30.

TABLE 1

AS-FORMED TR-S SPAC ® PRODUCT

| THREAD SIZE mm | PUNCH DIAMETER mm | SMOOTH BORE DIAMETER mm | ZONE-28 CROSS-SECTIONAL AREA mm$^2$ | ZONE-30 CROSS-SECTIONAL AREA mm$^2$ | ZONE-24 CROSS-SECTIONAL AREA mm$^2$ | ESTIMATE of COMPRESSIVE STRENGTH ZONE-28 STRESS 785 Mpa N | ESTIMATE of COMPRESSIVE STRENGTH ZONE-30 STRESS 785 Mpa N | ESTIMATE of COMPRESSIVE STRENGTH ZONE-24 STRESS 785 Mpa N | AS-FORMED UNIFORM HARDNESS TOTAL PUNCH COLUMN STRENGTH kN |
|---|---|---|---|---|---|---|---|---|---|
| 6.00 | 12.50 | 5.45 | 4.946 | 38.926 | 55.518 | 3,883 | 30,557 | 43,582 | 78.0 |
| 8.00 | 14.55 | 7.31 | 8.297 | 49.579 | 66.427 | 6,513 | 38,919 | 52,145 | 97.6 |
| 10.00 | 17.05 | 9.17 | 12.497 | 65.130 | 84.646 | 9,810 | 51,127 | 66,449 | 127.4 |
| 12.00 | 19.30 | 11.03 | 17.545 | 79.265 | 100.192 | 13,773 | 62,223 | 78,650 | 154.6 |

TABLE 1-continued

INDUCTION HARDENED TR-S SPAC ® PRODUCT

| THREAD SIZE mm | PUNCH DIAMETER mm | SMOOTH BORE DIAMETER mm | ZONE-28 CROSS-SECTIONAL AREA mm² | ZONE-30 CROSS-SECTIONAL AREA mm² | ZONE-24 CROSS-SECTIONAL AREA mm² | ESTIMATE of COMPRESSIVE STRENGTH ZONE-28 STRESS 785 MPa N | ESTIMATE of COMPRESSIVE STRENGTH ZONE-30 STRESS 1100 MPa N | ESTIMATE of COMPRESSIVE STRENGTH ZONE-24 STRESS 1500 MPa N | INDUCTION HARDENED TOTAL PUNCH COLUMN STRENGTH kN | STRENGTH INCREASE WITH INDUCTION HARDENING APPROX. |
|---|---|---|---|---|---|---|---|---|---|---|
| 6.00 | 12.50 | 5.45 | 4.946 | 38.926 | 55.518 | 3,883 | 42,819 | 83,277 | 130.0 | 66.6% |
| 8.00 | 14.55 | 7.31 | 8.297 | 49.579 | 66.427 | 6,513 | 54,537 | 99,640 | 160.7 | 64.7% |
| 10.00 | 17.05 | 9.17 | 12.497 | 65.130 | 84.646 | 9,810 | 71,643 | 126,972 | 208.4 | 63.6% |
| 12.00 | 19.30 | 11.03 | 17.545 | 79.265 | 100.192 | 13,773 | 87,191 | 150,287 | 251.3 | 62.5% |

BASIC AREA FORMULA = (PI/4) * (D² − d²)
BASIC STRENGTH FORMULA = STRESS * AREA
PERCENT INCREASE STRENGTH = 100% (kN INDUCTION − kN UNIFORM)/(kN UNIFORM)

The "as-formed" clinch fastener does not include zones of differing hardness and the strength of the pilot portion may be determined with a single area calculation. However, the strength of the "as-formed" fastener is reported as if it also comprised zones of similar cross-sectional areas with the metal forming each of the zones having the same compressive strength.

A comparison of the total pilot portion compression strength or column strength for each of the thread sizes shows more than a 60% increase in strength through the use of selective strength hardening. These increases in strength allow the same fastener to be used with all of the high strength materials referenced above while retaining the original "as-formed" hardness in the inner zone in order to permit the use of thread rolling screws. As referenced earlier, the inventive process may be used in connection with pre-threaded nuts. Also, the selective hardening process may be used in connection with pre-threaded nuts that are through-hardened to hardness levels normally associated with ASTM A563M-PC10 thereby providing similar piercing and setting enhancements for this class of product.

Figure 6:
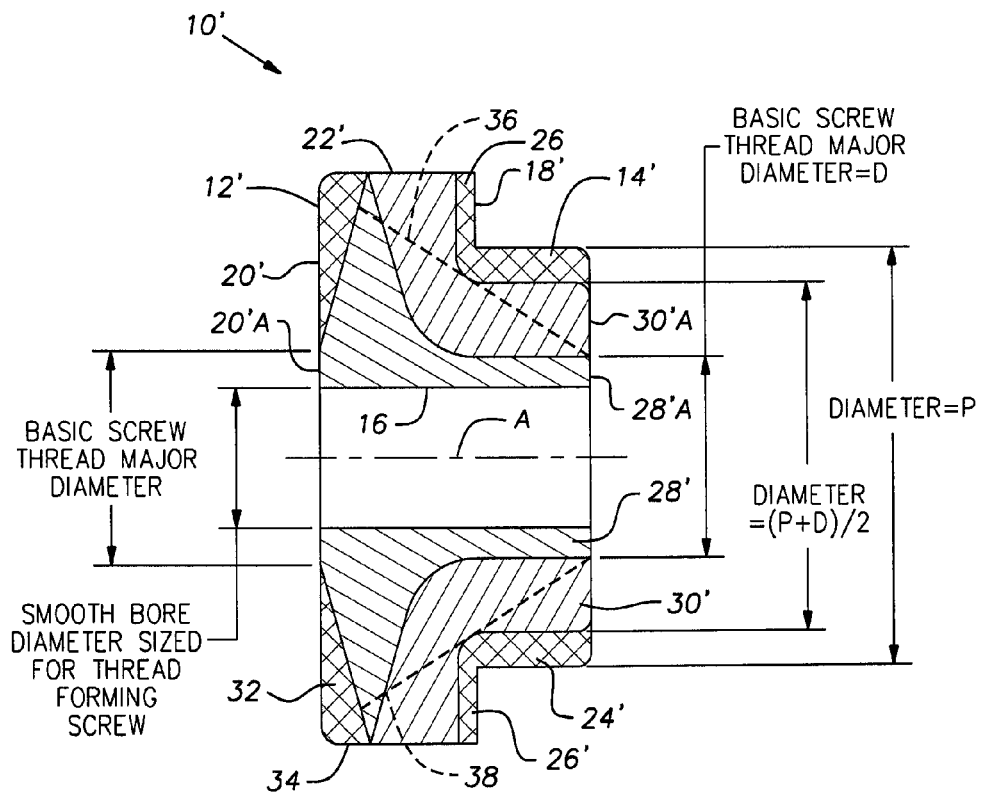
FIG. 6 is a sectional view similar to FIG. 1 showing a clinch fastener selectively hardened in accordance with a second embodiment of the invention.

Referring to FIG. 6, a second embodiment of a clinch fastener having selectively hardened portions is shown. In this embodiment, elements identical with those of the first embodiment are identified with the same reference numerals and modified elements are marked with a prime designation.

The self-piercing clinch nut 10' has a body portion 12' and a pilot or punch portion 14' extending from one end of the body portion 12'. A thread blank or bore 16 extends along the longitudinal axis A of the nut 10'. As in the first embodiment, the body portion 12' includes an annular mounting or bottom end face 18', an annular top end face 20' and a peripheral body face 22' that joins the end face 18' and the top face 20'.

In this embodiment, the annular top end face 20' is also selectively hardened to provide a top zone 32 remote of the inner zone 28'. The top zone 32 has an annular shape extending transversely or radially outwardly along the end face 20' from an annular top end face 20'A corresponding with the thread major diameter to the outer peripheral body face 22'.

The top zone 32 has a hardness corresponding with that of the outer zone 24'. The increased hardness of the top zone further resists crushing and/or plastic deformation of the metal forming the top end face 20'.

The top zone 32 has a progressively increasing axial dimension in a transversely or radially outward direction. The top zone 32 reduces the axial thickness of the adjacent inner zone 28' in the body portion 12'. As shown, the top zone 32 thereby provides a peripheral zone 34 extending along the peripheral body face 22' which also cooperates to resist undesirable distortion of the metal forming the body portion 12'.

In a further modification, the peripheral zone 34 may be extended to the dotted line 36 to form an enlarged peripheral zone 38 that extends along the full axial extent of the peripheral body face 22'. The enlarged peripheral zone 38 further reinforces the body portion 12' against crushing and/or plastic deformation during the piercing and/or setting of the nut 10'.

The enlarged peripheral zone 38 extends into the pilot portion 14' and along the annular face 30'A. Accordingly, the top zone 32 and the zone 38 extend throughout substantially all of the nut 10' radially outward of the inner zone 28' and along substantially all of the nut outer surfaces except the annular end face 28'A and the top end face 20'A on the end face 20'. In this manner, the nut 10' is provided with a selectively hardened structure at substantially all locations radially outward of the thread forming region, which generally corresponds with the screw thread major diameter. This is desirable for enabling the nut to be used with metal members of differing hardness values and higher strengths. In addition to facilitating the piercing of the metal member, the cutting and plastic deformation of the metal member by the nut is enhanced since the nut mounting or bottom end face 18 is hardened.

The resulting nut 10' has joined and substantially continuous zones of increased hardness about nearly the entire periphery or outer portions of the fastener.

Figure 7:
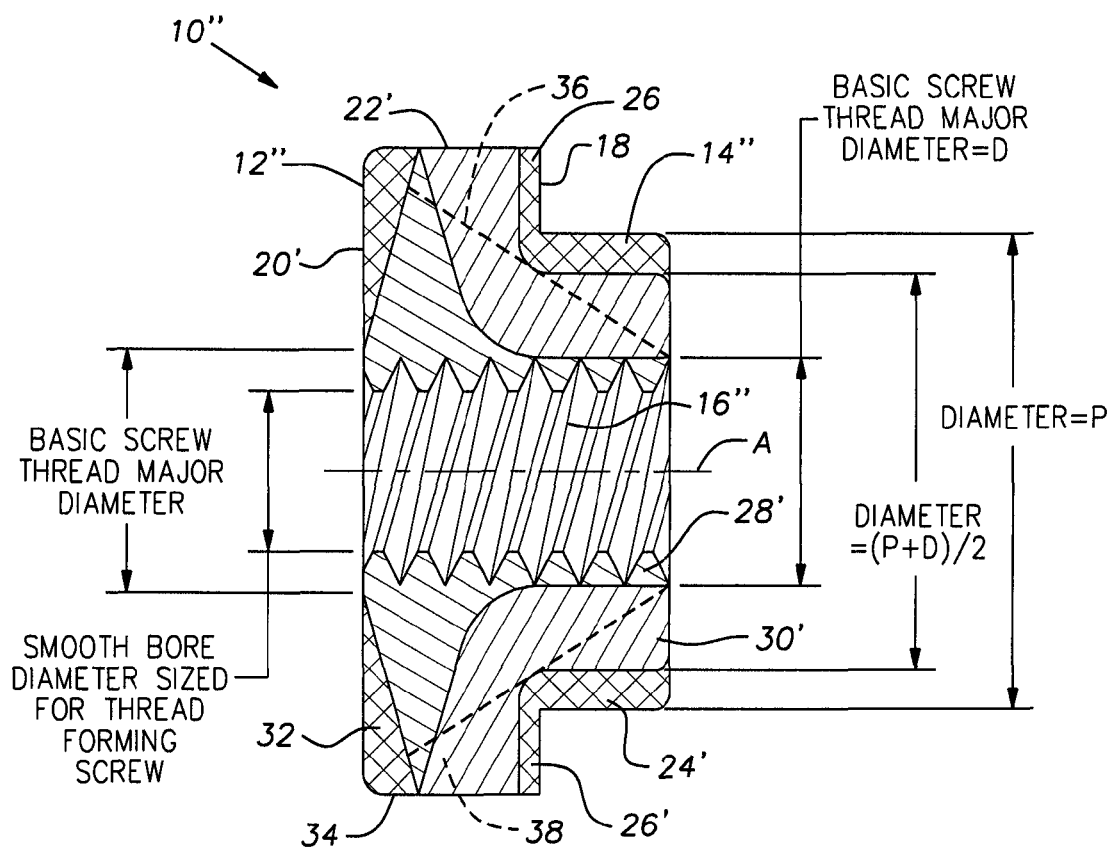
FIG. 7 is a sectional view similar to FIG. 1 showing a pre-threaded clinch fastener selectively hardened in accordance with a third embodiment of the invention.

Referring to FIG. 7, a third embodiment of a clinch fastener having selectively hardened portions is shown. In this embodiment, elements identical with those of the modified second embodiment are identified with the same reference numerals and modified elements are marked with a double prime designation.

The self-piercing clinch nut 10" has a body portion 12" and a pilot or punch portion 14" extending from one end of the body portion. In this embodiment, the nut 10" is pre-threaded and a screw thread 16" is formed in the thread blank and extends along the longitudinal axis A. As shown, the outside diameter of the thread 16" substantially corresponds with the transverse or radial extent of the inner zone 28' in the pilot portion 14" of the nut. Within the body portion 12", the inner zone 28' flares transversely or radially outward and extends to the outer peripheral body face 22' within the body portion 12".

As described in connection with the second embodiment, the nut 10" may also be provided with a top zone 32 in its top face 20'. A peripheral zone 34 extends along the peripheral body face 22'. Again, the top zone 32 may extend to the dotted line 36 to form the enlarged peripheral zone 38 to substantially encase the nut 10" in joined and continuous zones of increased metal hardness.

Clinch nuts having various pilot shapes, annular face arrangements and lugs are also illustrated in Design applications Nos. D440,865S, D448,659S and D448,660S. Selected figures from these design cases are included herein and briefly discussed below.

Figure 8:
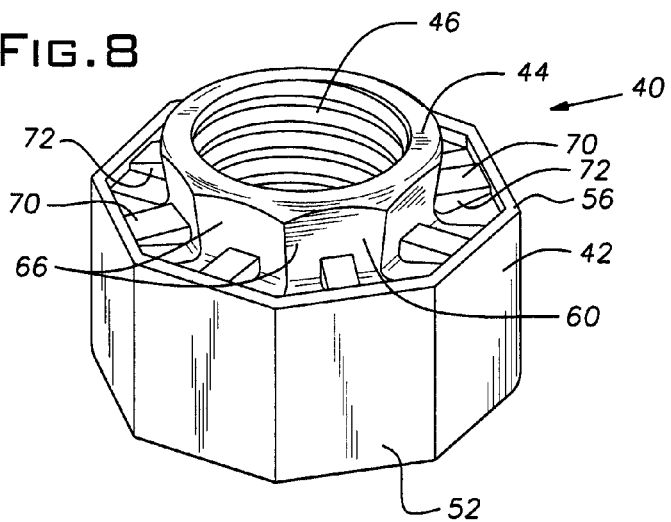
FIGS. 8 through 10 respectively comprise a perspective view, a bottom plan view and a sectional view of a clinch nut including a specific piercing and/or engagement geometric configuration that may be induction hardened in accordance with the invention.
Figures 9, 10:
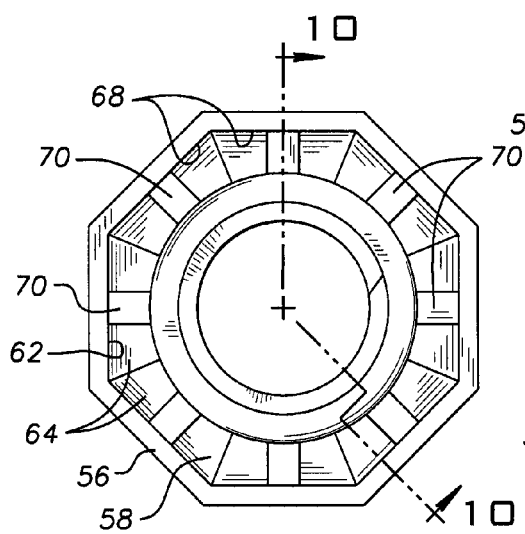

Referring to FIGS. 8 through 10, a nut 40 is shown. The nut 40 includes a body portion 42, a pilot portion 44 and a screw thread 46 extending along a central axis.

The nut 40 includes a mounting or bottom end face 48, an annular top end face 50 and a peripheral body face 52 joining the bottom and top faces. A generally annular shaped groove 54 is formed in the bottom face 48 surrounding the pilot portion 44. The bottom face 48 also includes an axially extending lip 56 at the outer periphery of the groove.

The groove 54 is preferably formed by a bottom wall 58, an inner wall 60 and an outer wall 62. In this embodiment, the bottom wall 58 is inwardly angled or inclined toward the inner wall 60 with the groove 54 increasing in-depth when radially moving from the outer periphery of the bottom wall to the inner periphery of the bottom wall.

The bottom wall 50 is preferably polygonally-shaped wherein it is formed by a plurality of angled or inclined, planar or flat faces or facets 64. If as shown, about 6 to 10 faces 64 may be used.

The inner wall 60 is inwardly angled or inclined such that the groove 54 forms an undercut in the pilot portion 44. The inner wall 60 is also preferably, polygonally-shaped in that it is formed by a plurality of angled or inclined, planar or flat faces or facets 66. As illustrated, the inner wall 60 and the bottom wall 58 may be formed by the same number of faces 66 and 64 respectively, and they may be aligned. In a like manner, the outer wall 62 may be formed of flat faces or facets 68. Again, the number of facets may be the same and they be aligned in each of the walls 58, 60 and 62.

The clinch nut 40 also includes a plurality of locking members or lugs 70 for increasing the torque or rotational resistance of the clinch nut 40. The lugs 70 are raised lobes or protuberances which axially extend above the bottom wall 58, the groove 54 and/or the lip 56 of the nut 40, and circumferentially extend a short distance to provide abutments 72. The abutments 72 resist rotation of the clinch nut 40 relative to a metal member to which it is to be mounted.

The abutments 72 are preferably perpendicular to the rotational motion of the nut. In the illustrated embodiment, the lugs 70 are formed by protuberances which axially extend above the groove bottom wall 58 and radially extend across the groove 54 from the groove inner wall 60 to the groove outer wall 62. The upper sides of the lug 70, remote from the bottom wall 58, are generally perpendicular to the central axis and are generally parallel to the lip 56 so that the lug has a wedge shape.

The lugs 70 are circumferentially spaced apart along the bottom wall 58, and a lug 70 may be centrally located in each face 64 of the bottom wall 58. However, the lugs may be located at other positions such as the interface between adjacent faces 64. The lugs 70 are illustrated with a rectangular cross-sectional shape, but any suitable shape may be used.

Referring to FIG. 10, the upper and lower halves of the nut 40 are shown to have different heat treatments for convenience of illustration. As indicated, the upper half of the nut 40 has an outer zone 24, a bottom zone 26, an inner zone 28 and an intermediate zone 30. The lower half of the nut 40 includes an inner zone 28' in the pilot portion 44 that flares transversely or radially outwardly in the body portion 42. A bottom zone 26' extends along the bottom face 48. An intermediate zone 30' extends between the inner zone 28' and outer zone 24. A top zone 32 is located at the nut top end face 50 and a peripheral zone 34 extends along the peripheral body face 52. The top zone 32 may extend to the dotted line 36 to form enlarged peripheral zone 38, as in prior embodiments.

In both of the heat treatments illustrated in FIG. 10, the bottom zone 26 or 26' extending along mounting or bottom face 48 is hardened to enhance engagement with the metal plate member. This includes hardening of the groove 54 and the lugs 70 therein. This facilitates the deformation of the metal member and mounting characterized by increased torque out and pull out properties as compared with an identical fastener not hardened in accordance with the invention.

Figure 11:
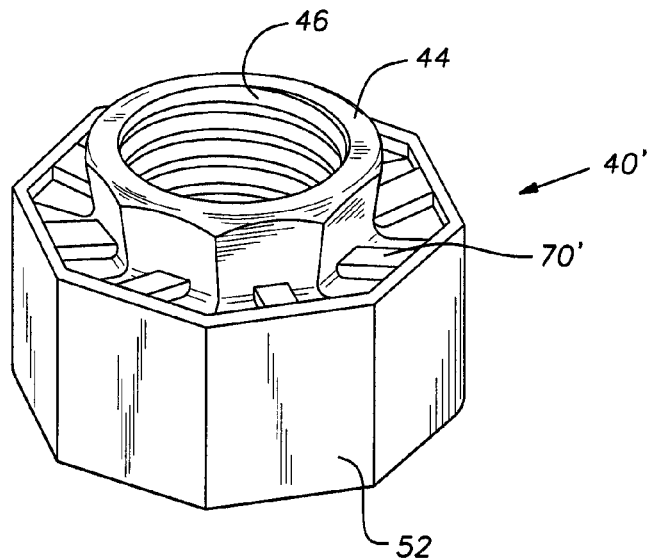
FIGS. 11 through 13 are similar to FIGS. 8 through 10 and show another clinch nut including a specific piercing and/or engagement geometric configuration that may be induction hardened in accordance with the invention.
Figure 12:
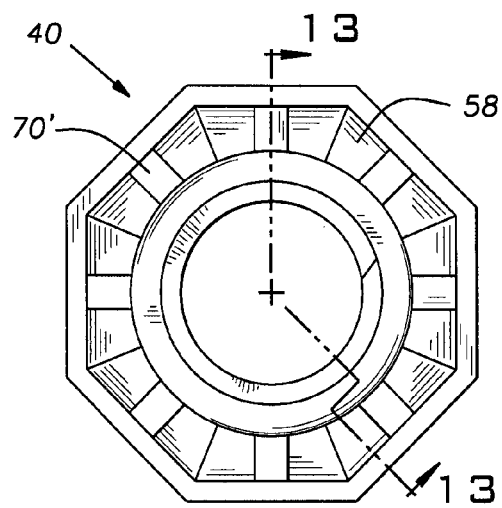
Figure 13:
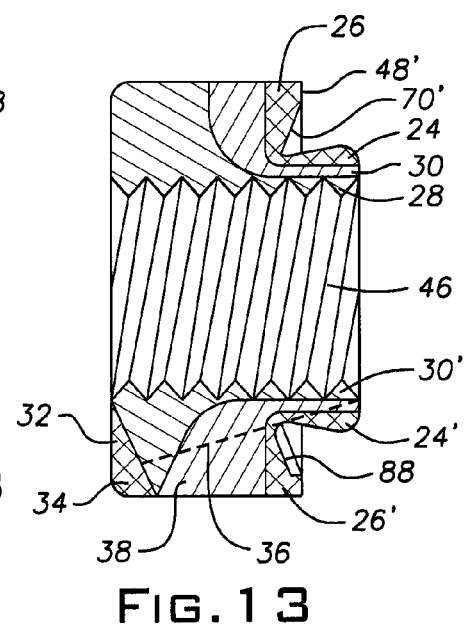

A nut 40' is shown in FIGS. 11-13. The nut 40' is identical with the nut 40 except for the shape of the lugs 70'. The lugs 70' are of uniform rectangular cross-section and have an upper surface that is parallel with the bottom wall 58 of the groove 54. Referring to FIG. 13, as in the prior embodiment, the upper and lower halves of the nut 40' are shown to have different heat treatments for convenience of illustration. Accordingly, the various zones are identified with the same reference numerals as used in FIG. 10.

Figure 14:
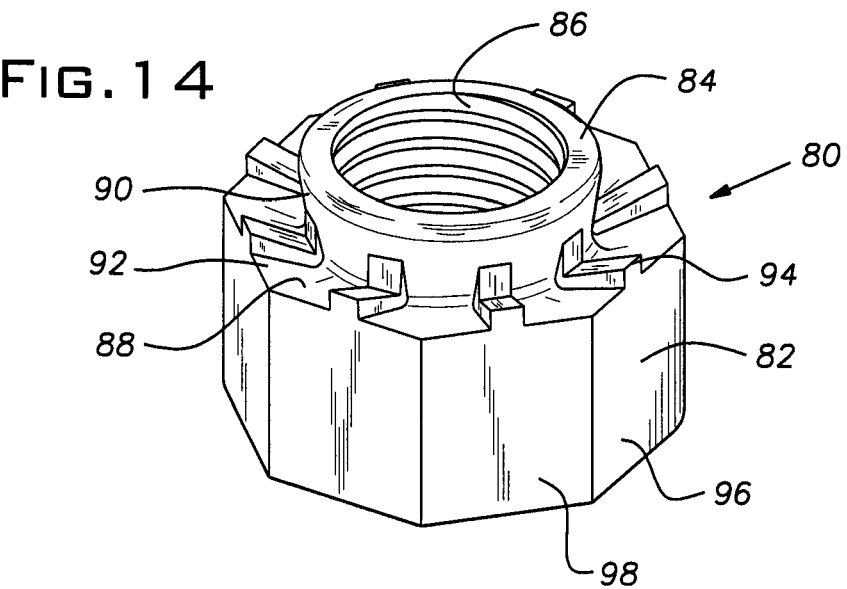
FIGS. 14 through 16 are similar to FIGS. 8 through 10 and show another clinch nut including a specific piercing and/or engagement geometric configuration that is induction hardened in accordance with the invention.
Figure 15:
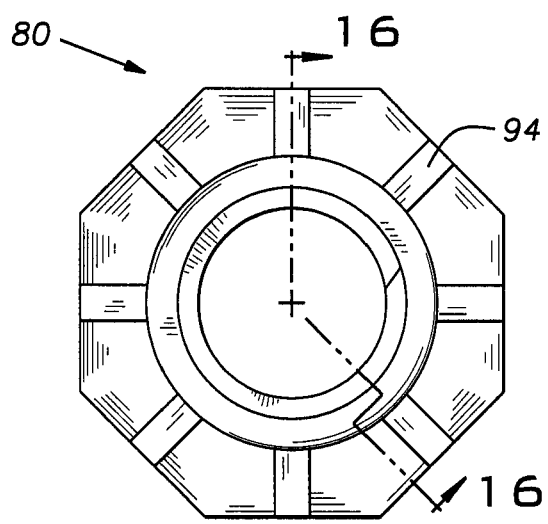
Figure 16:
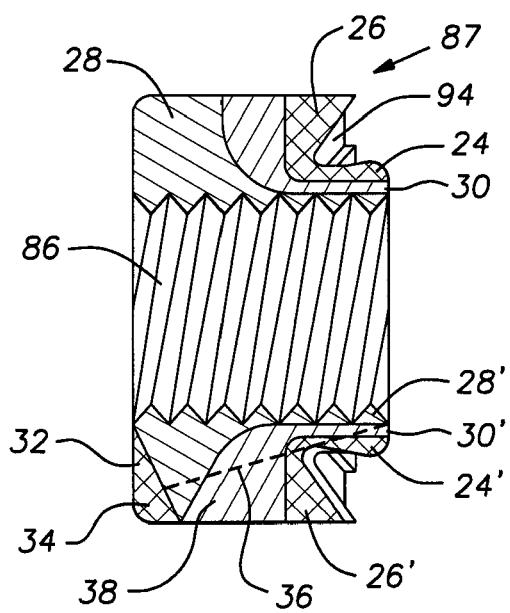

Referring to FIGS. 14-16, a nut 80 is shown having a body portion 82, a pilot portion 84 and a screw thread 86 extending along a central axis. The nut 80 includes an annular mounting or bottom face 87. The bottom end face 87 includes an annular groove 88 that extends about the pilot portion 84, and a hardened bottom zone 26 or 26' extends along the face 87.

The groove 88 is formed by an inner wall 90 and a bottom wall 92. The walls 90 and 92 are smooth or circular as distinguished from the facet shape walls described in the foregoing embodiments. The inner wall 90 is inclined inwardly to form an undercut and, similarly, the bottom wall 92 is inwardly angled or inclined toward the inner wall 90 with the groove 88 increasing in-depth in a radial direction toward the pilot portion 84. There is no outer lip in this nut arrangement.

Lugs 94 radially extend along the entire extent of the bottom wall 92 and partially up the inner wall 90. The lugs are centrally spaced relative the peripheral body face 96 or, more particularly, the wrenching flats 98, but they may be placed at corner locations. The lugs 94 have a rectangular cross-section, but any suitable shape may be used and it is not necessary that the lug extend up the inner wall 90.

Referring to FIG. 16, as in the prior embodiment, the upper and lower halves of the nut 80 are shown to have different heat treatments for convenience of illustration. Accordingly, the various zones are identified with the same reference numerals as used in FIG. 10.

Referring to FIGS. 17-19, a nut 100 is shown having a body portion 102, a pilot portion 104 and a screw thread 106 extending along a central axis. A bottom end face 107 includes an annular groove 108 that extends about the pilot portion 104.

The groove 108 is formed by a bottom wall 110, an inner wall 112. In this embodiment, the bottom wall 110 is inwardly angled or inclined toward the inner wall 112 with the groove 108 increasing in-depth when radially moving from the outer periphery of the bottom wall to the inner periphery of the bottom wall.

The bottom wall 110 is formed by a plurality of inclined facets 114 similar to the facets 64 in the nut 40. Further, the inner wall 112 is inwardly angled or inclined such that the groove 108 forms an undercut in the pilot portion 104. The inner wall 112 is also preferably, polygonally-shaped with a plurality of angled or inclined, planar or flat faces or facets 116 similar to the facets 66 in the nut 40.

The bottom 110 of the groove 108 intersects a "flush" lip 118 extending about the periphery of the body portion 102. The lip 118 is flush in that it does not extend axially beyond its intersection with the bottom wall 110. The lip 118 is perpendicular to the pilot portion 104 and the axis of the nut. Lugs 120 are centrally disposed in the facets 114 and have upper surfaces which may or may not be parallel with bottom wall 110.

Referring to FIG. 19, as in the prior embodiment, the upper and lower halves of the nut 100 are shown to have different heat treatments for convenience of illustration. Accordingly, the various zones are identified with the same reference numerals as used in FIG. 10.

The geometry of the engaging faces of the clinch fastener does not interfere with the induction hardening of the present invention. In most cases, typical induction hardening zones may be useful with a diverse range of clinch fastener geometries. That is, the zone dimensions will encompass protruding lugs and undercut surfaces as the required hardness in the outer zone is established.

Accordingly, the foregoing selective hardening processes are useful in connection with clinch fasteners having various pilot and annular face configurations as well as specially configured or shaped elements including lugs, protuberances, notches, recesses, sloped walls and re-entrant shaped grooves or the like, as known in the art and shown herein. The provision of the various hardened bottom zones described above is compatible with such configurations and lugs. In fact, the hardening of the lugs improves the penetration of the lugs into the metal member and the interlock formed.

Referring to FIGS. 20 and 21, a clinch nut 120 is shown including a body portion 122 and a pilot portion 124. A threaded bore 126 is provided, but the bore may be unthreaded to receive a self-threading screw or the like. A bearing or bottom end face 128 includes an annular flange 130 surrounding the pilot portion 124 and cooperates therewith to define an annular groove 134. Circumferentially spaced radial lugs 136 and radial grooves 138 in the flange 130 are provided to enhance engagement with a metal member. The details of this clinch nut are described in U.S. Pat. No. 6,851,904.

As particularly shown in FIG. 21, the clinch nut 120 may be heat treated in accordance with the invention to provide selectively hardened zones. For convenience, the upper and lower halves of the nut 120 are shown to have different heat treatments. As indicated, the upper half of the nut 120 has an outer zone 24, an inner zone 28 and an intermediate zone 30. The lower half of the nut 120 includes an inner zone 28', an intermediate zone 30', a top zone 32 and a peripheral zone 34. The top zone 32 may extend to the dotted line 36 to form enlarged peripheral zone 38.

Referring to FIGS. 22 and 23, a clinch nut 140 is shown including a body portion 142 and a pilot portion 144. A threaded bore 146 is provided, but the bore may be unthreaded to receive a self-threading screw or the like. A bearing face or bottom end 148 includes an annular flange 150 surrounding the pilot portion 144 and cooperates therewith to define an annular groove 154. In preferred arrangements, the opposed walls of the pilot portion 144 and the flange 150 respectively provide inner and outer sidewalls of the groove 154 that are inclined to form a restricted opening to the groove 154. Circumferentially spaced radial lugs 156 and radial grooves 158 in the flange 150 are provided to enhance engagement with a metal member. The details of this clinch nut are described in U.S. Pat. No. 6,994,500.

As particularly shown in FIG. 23, the clinch nut 140 may be heat treated in accordance with the invention to provide selectively hardened zones. As in the prior embodiment, the upper and lower halves of the nut 140 are shown to have different heat treatments. As indicated, the upper half of the nut 140 has an outer zone 24, an inner zone 28 and an intermediate zone 30. The lower half of the nut 140 includes an inner zone 28', an intermediate zone 30', a top zone 32 and a peripheral zone 34. The top zone 32 may extend to the dotted line 36 to form enlarged peripheral zone 38.

Referring to FIGS. 24 and 25, a self-attaching female fastener 160 includes a central pilot portion 162 having an end face 164 and flange portions 166. The opposed sides of the flange portions provide generally planar support faces 168. A pair of parallel re-entrant grooves 170 has a V-shaped bottom wall and relatively inclined bottom faces. A threaded bore 172 extends through the pilot portion 162, but an unthreaded bore may be provided for use with a self-tapping or thread rolling male fastener. The details of this female fastener are described in U.S. Pat. No. 6,997,659.

Referring to FIG. 25, the female fastener 160 may be heat treated to provide selectively hardened zones in accordance with the present invention. For convenience, the upper and lower halves of the fastener 160 are shown to have different heat treatments. As indicated, the upper half of the fastener 160 has an outer zone 24, an inner zone 28 and an intermediate zone 30. The lower half of the fastener 160 includes an inner zone 28', an intermediate zone 30', a top zone 32 and a peripheral zone 34. The top zone 32 may extend to the dotted line 36 to form enlarged peripheral zone 38.

Referring to FIGS. 26 and 27, a female fastener 180 useful as a pierce nut or as a clinch nut is shown. The fastener 180 includes a body portion 182 and a pilot portion 184 having and axial threaded bore 186. The bore 186, may be unthreaded to receive a self-tapping or thread rolling male fastener. A bearing face 188 includes an annular flange 190 surrounding the pilot portion 184 and cooperates therewith to define an annular groove 192. The groove 192 may have a re-entrant configuration as is known in the art. The groove 192 includes a bottom wall 194 having a plurality of wedge-shaped circumferentially spaced recesses 196. The details of this female fastener are described in U.S. Pat. No. 7,001,125.

As particularly shown in FIG. 27, the fastener 180 may be heat treated in accordance with the invention to provide selectively hardened zones. For convenience, the upper and lower halves of the fastener 180 are shown to have different heat treatments. As in the prior embodiment, the upper half of the fastener 180 has an outer zone 24, an inner zone 28 and an intermediate zone 30. The lower half of the fastener 180 includes an inner zone 28', an intermediate zone 30', a top zone 32 and a peripheral zone 34. The top zone 32 may extend to the dotted line 36 to form enlarged peripheral zone 38.

Figure 28:
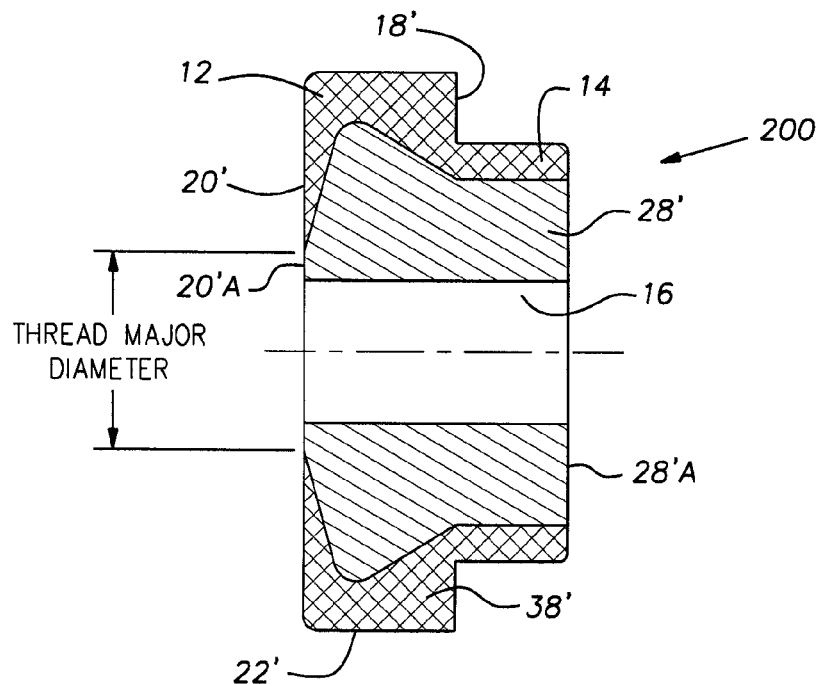
FIG. 28 is a sectional view similar to FIG. 1 showing a fastener selectively hardened in accordance with the invention and illustrating the generally continuous heat hardened outer zone substantially enclosing an inner zone having a lesser hardness.

Referring to FIG. 28, a fastener 200 is shown. The fastener 200 is similar to the clinch nut 10 and corresponding elements are similarly numbered with the addition of a prime designation. The fastener 200 has been selectively hardened in accordance with the preferred embodiments of the present invention, and the joined hardness zones are shown combined in accordance with empirically determined results.

The fastener 200 includes a body portion 12 and a pilot or punch portion 14. A thread blank or bore 16 extends along a central axis of the fastener 200. The fastener includes an annular mounting or bottom end face 18' extending around the pilot portion 14. The body portion 12 has a top face 20' and a peripheral body face 22' joins the top face 20' with the bottom end face 18'.

As illustrated, the fastener 200 includes an inner zone 28' having an "as-formed" hardness and an outer peripheral zone 38' having an increased hardness. The inner and outer zones form the full transverse extent of said fastener. The outer zone 38' has a generally cylindrical shape within the pilot portion 14 and radially expands within the body portion 12 to provide the zone with a bulbous shape or profile. This reduces the heat hardening required along the periphery of the body portion 12 while providing the inner zone in the body portion with an increased size.

The zone 38' is selectively hardened to a hardness value of from about 40 Rc to about 60 Rc. In the inner zone 28', the as-formed hardness value of about 90 Rb at the bore 16 transitions to about 40 Rc at the outer peripheral zone 38'. The zone 38' includes the zones 26, 32, 34 and 38 as described in connection with prior embodiments. The outer peripheral zone 38' thereby substantially encloses and surrounds the inner zone 28'. The inner zone 28' includes an exposed annular end face 20'A in the top surface 20' and an annular bottom face 28'A adjacent the end face of the pilot portion 14. Accordingly, the outer peripheral zone 38' of increased hardness extends along all of the outer surfaces of the fastener 200 except for the annular faces 20'A and 28'A.

Figures 29, 30:
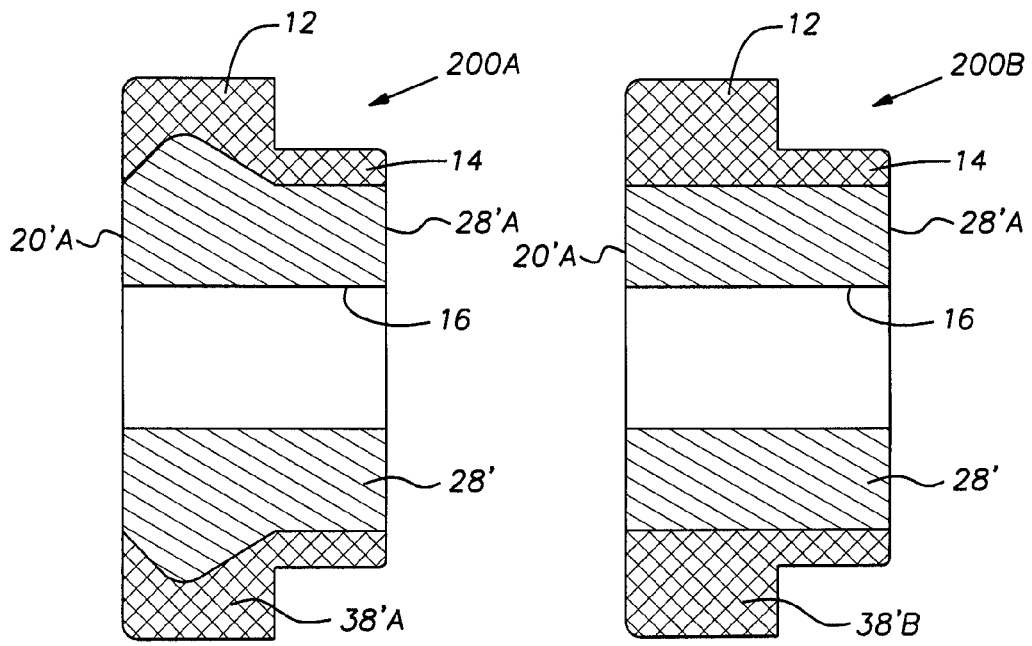
FIG. 29 is a sectional view similar to FIG. 28 showing a fastener hardened in accordance with a modification of the invention.
FIG. 30 is a sectional view similar to FIG. 29 showing a fastener hardened in accordance with a further modification of the invention.

Referring to FIG. 29, a fastener 200A is substantially identical to the fastener 200, except for a modified hardened outer zone 38'A. In this modification, the hardening along the top face 20' is reduced and the annular face 20'A has an increased radial dimension.

Referring to FIG. 30, the fastener 200B is shown with a modified outer hardened zone 38' B. In this modification, the inner zone 28' has a substantially cylindrical shape and a uniform radial dimension. Accordingly, the annular face 20'A and the annular face 28'A are of equal size.

Although particular embodiments of the invention have been described in detail, it will be understood that the invention is not limited correspondingly in scope, but includes all changes and modifications coming within the spirit and terms of the claims appended hereto.

What is claimed is:

1. A self-clinching metal fastener for attachment to a plastically deformable metal member, said fastener including a body portion having a central axis, an axially extending pilot portion surrounding a central bore, said fastener having a transverse extent including an inner zone adjacent said bore and an outer zone adjacent an outer periphery of said fastener, said inner zone having an inner zone hardness and said outer zone having an outer zone hardness wherein at least a hardness of the outer zone is formed by a selective heat treatment, wherein said inner zone has a generally cylindrical shape in said pilot portion and radially extends to provide said inner zone with a bulbous shape in said body portion, wherein the bulbous shape results in the outer zone having a varying radial thickness of increased hardness, said outer zone hardness being greater than said inner zone hardness, said pilot portion including a first annular pilot end face extending around said bore and a second annular pilot end face extending around said first annular pilot end face, said first and second annular pilot end faces respectively having first and second pilot end face hardnesses, said second pilot end face hardness being greater than said first pilot end face hardness.

2. The fastener of claim 1, wherein said fastener has an axial length and said bore extends through the axial length of said fastener, said inner zone extends around said bore along the axial length of said fastener and said outer zone extends around said inner zone along the length of said fastener, said inner zone and outer zone cooperate to form all of said transverse extent of said fastener, and said outer zone provides said fastener with increasing hardness at locations transversely outward from said inner zone.

3. The fastener of claim 2, wherein said body portion includes a bottom end face extending radially inward to said pilot portion and wherein the bottom end face includes a bottom end face transverse extent surrounding said pilot portion, at least a portion of said outer zone has a transverse extent that is at least about equal to said bottom end face transverse extent, and said outer zone extends to said bottom end face to provide said bottom end face with a hardness equal to said outer zone hardness.

4. The fastener of claim 3, wherein said bottom end face includes shaped elements for deforming and receiving plastically deformable metal, said shaped elements being selected from the group consisting of lugs, protuberances, notches, recesses, inclined walls, grooves and re-entrant shaped grooves.

5. The fastener of claim 3, wherein said bottom end face includes a groove having an inclined inner wall forming an undercut for receiving metal plastically deformed from said metal member.

6. The fastener of claim 2, wherein said body portion includes a top radial end face having an annular top end face extending around said bore and having a hardness substantially equal to said inner zone hardness.

7. The fastener of claim 6, wherein said body portion includes a bottom end face extending radially inward to said pilot portion, said bottom end face includes shaped elements for deforming and receiving plastically deformable metal, said shaped elements being selected from the group consisting of lugs, protuberances, notches, recesses, inclined walls, grooves and re-entrant shaped grooves.

8. The fastener of claim 6, wherein said body portion includes a bottom end face extending radially inward to said pilot portion, wherein the bottom end face includes a bottom end face transverse extent surrounding said pilot portion, at least a portion of said outer zone has a transverse extent that is at least about equal to said bottom end face transverse extent, and said outer zone extends to said bottom end face to provide said bottom end face with a hardness substantially equal to said outer zone hardness.

9. The fastener of claim 8, wherein said outer zone has a hardness in the range of from about 40 Rc to about 60 Rc and said inner zone has a hardness in the range of from about 32 Rc to about 90 Rb.

10. The fastener of claim 9, wherein said outer zone has an ultimate tensile strength of about 218,550 psi or 1,500 MPa and said inner zone has an ultimate tensile strength of about 113,850 psi or 785 Mpa.

11. The fastener of claim 1, wherein said second annular pilot end face and said outer zone each have a hardness in the range of from about 40 Rc to about 60 Rc, and said first annular pilot end face and said inner zone each have a hardness in the range of from about 32 Rc to about 90 Rb.

12. The fastener of claim 1, wherein said fastener is pre-threaded and has a screw thread major diameter extending about said central axis, said first annular pilot end face has a major dimension at least equal to said major diameter.

13. The fastener of claim 1, wherein said outer zone has an ultimate tensile strength of about 218,550 psi or 1,500 MPa and said inner zone has an ultimate tensile strength of about 113,850 psi or 785 Mpa.

14. The fastener of claim 1, wherein said fastener is a nut, said bore is a smooth bore thread blank, said inner zone extends transversely outward from said bore for a distance at least equal to or greater than an outer diameter of a thread formed in the bore, said inner zone hardness is suitable for threading by engagement with a thread forming screw, said inner and outer zones forming the full transverse extent of said fastener, and said outer zone providing a substantially continuous zone of increased hardness at substantially all locations in the fastener transversely outward of said inner zone.

15. A self-clinching metal fastener for attachment to a plastically deformable metal member, said fastener including a body portion having a central axis and an axially extending pilot portion surrounding a central bore, said fastener having a transverse extent including an inner zone adjacent said bore and an outer zone adjacent said outer periphery of said fastener, wherein said inner zone has a generally cylindrical shape in said pilot portion and radially extends to provide said inner zone with a bulbous shape in said body portion, wherein the bulbous shape results in the outer zone having a varying radial thickness of increased hardness, said inner zone having an inner zone hardness and said outer zone having an outer zone hardness wherein at least a hardness of the outer zone is formed by a selective heat treatment, said outer zone hardness being greater than said inner zone hardness, said pilot portion including a first annular pilot end face extending around said bore and a second annular pilot end face extending around said first annular pilot end face, said first and second annular pilot end faces respectively having first and second pilot end face hardnesses, said second pilot end face hardness being greater than said first pilot end face hardness, said body portion including a top radial end face, said top radial end face having an annular top end face extending around said bore and having a hardness substantially equal to said inner zone hardness.

16. The fastener of claim 15, wherein said fastener has an axial length and said bore extends through the axial length of said fastener, said inner and outer zones forming said transverse extent of said fastener, and said outer zone forming a proportion of the transverse extent of said fastener along the axial length of said fastener.

17. The fastener of claim 16, wherein said pilot portion includes a pilot end wall formed by said first and second annular pilot end faces, said inner and outer zones intersect said pilot end wall to respectively form said first and second annular pilot end faces.

18. The fastener of claim 15, wherein said body portion includes a bottom end face wherein the bottom end face includes a bottom end face transverse extent extending inwardly to said pilot portion, at least a portion of said outer zone has a transverse extent that is at least about equal to said bottom end face transverse extent, and said outer zone extends to said bottom end face to provide said bottom end face with a hardness substantially equal to said outer zone hardness.

* * * * *